United States Patent
Lowry et al.

(10) Patent No.: US 6,848,874 B2
(45) Date of Patent: Feb. 1, 2005

(54) SPRING FASTENER HAVING MULTIFUNCTIONAL BARBS

(76) Inventors: Joseph William Lowry, 14498 Dan Patch, Liberty, IL (US) 60048; Eustathios Vassiliou, 12 S. Townview La., Newark, DE (US) 19711

( * ) Notice: Subject to any disclaimer, the term of this patent is extended or adjusted under 35 U.S.C. 154(b) by 0 days.

(21) Appl. No.: 10/209,765

(22) Filed: Aug. 1, 2002

(65) Prior Publication Data

US 2003/0231939 A1 Dec. 18, 2003

Related U.S. Application Data

(60) Provisional application No. 60/388,976, filed on Jun. 14, 2002.

(51) Int. Cl.[7] .............................................. F16B 37/04
(52) U.S. Cl. ........................ 411/182; 24/289; 411/55; 411/60.2; 411/173
(58) Field of Search .......................... 411/182, 55, 61, 411/173, 542, 915, 60.2, 183, 60.1, 258; 24/289, 293, 294, 295

(56) References Cited

U.S. PATENT DOCUMENTS

| | | | | |
|---|---|---|---|---|
| 2,198,186 A | * | 4/1940 | Tinnerman ................... | 24/294 |
| 2,223,622 A | * | 12/1940 | Kost ............................. | 24/293 |
| 2,243,322 A | * | 5/1941 | Van Uum ..................... | 24/293 |
| 2,326,903 A | * | 8/1943 | Tinnerman ................... | 248/500 |
| 2,342,832 A | * | 2/1944 | Borchers ...................... | 292/17 |
| 2,567,884 A | * | 9/1951 | Heath ........................... | 411/61 |
| 2,692,414 A | * | 10/1954 | Poupitch ....................... | 24/293 |
| 3,649,059 A | * | 3/1972 | Davidson ..................... | 248/239 |
| 4,382,414 A | * | 5/1983 | Svirklys ....................... | 108/56.1 |
| 4,500,238 A | | 2/1985 | Vassiliou ...................... | 411/30 |
| 4,595,325 A | * | 6/1986 | Moran et al. ................. | 411/173 |
| 4,610,588 A | * | 9/1986 | Van Buren et al. .......... | 411/173 |
| 4,644,612 A | * | 2/1987 | Osterland ..................... | 24/295 |
| 4,765,788 A | | 8/1988 | Nowak et al. ................ | 411/61 |
| 4,874,277 A | | 10/1989 | Nowak et al. ................ | 411/61 |
| 4,941,340 A | | 7/1990 | Nowak et al. ................ | 72/379.2 |
| 5,100,273 A | | 3/1992 | Vassiliou ...................... | 411/60 |
| 5,367,751 A | * | 11/1994 | DeWitt ......................... | 24/295 |
| 5,429,467 A | | 7/1995 | Gugle et al. .................. | 411/182 |
| 5,636,891 A | * | 6/1997 | Van Order et al. .......... | 296/37.7 |
| 5,725,343 A | | 3/1998 | Smith ........................... | 411/55 |
| 5,759,004 A | * | 6/1998 | Kuffel .......................... | 411/508 |
| 5,774,949 A | * | 7/1998 | Cornell et al. ............... | 24/293 |
| 5,846,039 A | * | 12/1998 | Kirchen et al. .............. | 411/34 |
| 5,873,690 A | * | 2/1999 | Danby et al. ................. | 411/55 |
| 6,095,734 A | * | 8/2000 | Postadan et al. ............. | 411/182 |
| 6,280,129 B1 | | 8/2001 | Lowry et al. ................. | 411/55 |
| 6,409,443 B1 | | 6/2002 | Lowry et al. ................. | 411/55 |
| 6,517,302 B2 | * | 2/2003 | Lee .............................. | 411/182 |
| 6,560,819 B2 | * | 5/2003 | Mizuno et al. ............... | 16/2.2 |
| 2002/0194710 A1 | * | 12/2002 | Dickinson et al. ........... | 24/295 |

* cited by examiner

Primary Examiner—J. J. Swann
Assistant Examiner—Carlos Lugo

(57) ABSTRACT

A fastener with critical configuration of the barbs, which allow the extraction of the fastener without destruction of the slot and/or the fastener. This critical configuration of the barbs allows fasteners to be used in slots of various widths and prevents rattling, which would take place in the case of fasteners of the present state of the art. The critical configuration is based on the special dimensions and special shape of the barbs with regard to the parts and the slots involved in assemblies of the fasteners and the parts. Assemblies of miscellaneous parts connected together by means of such fasteners, as well as vehicles comprising such assemblies may be made. In addition, fasteners with a combination of low and high barbs, which combination prevents rattling of the fastener and allows secure attachment on a part, such as a sheet metal, for example, are included.

22 Claims, 4 Drawing Sheets

SPRING FASTENER HAVING MULTIFUNCTIONAL BARBS

RELATED APPLICATIONS

This application claims priority of provisional patent application No. 60/388,976, filed on Jun. 14, 2002, which is incorporated herein by reference in its entirety.

FIELD OF THE INVENTION

This invention pertains fasteners, and more particularly fasteners which have expandable legs and which attach one object to another object. It also pertains combinations of one or more objects with said fastener(s), assemblies of fasteners with a part, parts or objects connected with the fastener(s), as well as vehicles comprising parts connected with said fastener(s).

BACKGROUND OF THE INVENTION

In the original conventional technology of fasteners employed to securely attach one object to another, such as for example one part to another in the case of an automobile or an appliance, has utilized a nut on one of the two objects, usually welded or glued to the back of said object, and a bolt passing through a hole on the second object in a manner to be engaged by the nut, thereby securing the two objects together.

This arrangement presents many problems, among which, one of the most important is that in the case that one object is hollow, the nut has to be in place at the back of the hollow object before assembling the two objects together. If for any reason the nut is misplaced, and/or if it becomes desirable to introduce a new fastening connection between the two objects, the task of achieving such connection becomes very difficult, if not impossible, for all practical purposes.

The so-called "quick nuts" have also been used to connect two objects. In addition, vibration during the operation of a device, such as an automobile or appliance for example, containing the two objects results very often in loosening of the bolt or "quick nut" and in either full disassembling of the objects from each other, or in a vibration noise which is most annoying and often of unacceptable levels. Further, such connections are not water-resistant and water may be easily penetrate the connection point and be transferred from one side of one or both objects to the other side.

Fasteners of the type described in U.S. Pat. No. 4,500,238 (Vassiliou) have been utilized to reduce considerably the potential of bolt or screw loosening and vibration. They have also eliminated the problem of having to place one member of the fastener at the back portion of the hollow object. These fasteners are placed through a slot from the front part of the hollow object. The second part of the fastener, being usually a bolt or a screw, supports the second object by forcing the legs of the fastener (as described for example in U.S. Pat. No. 4,500,238) to open or expand, thereby securing the two objects together. The fasteners of this type have greatly improved the prevailing torque (torque required to render a screw loose), as well as the pulling force (pulling force applied on a screw to the point of failure) of the system.

The fasteners of the type described in U.S. Pat. No. 4,500,238 have a funnel portion into which an expanding is driven for expanding the legs of the fastener. This funnel has a bucket-like shape which has been impressed on the legs during the manufacture of the fastener. This impression derived funnel is rather inflexible and in some occasions has a tendency to drive the expanding member in undesired direction.

An example of fasteners having oblong funnels is described in U.S. Pat. No. 6,280,129 B1 (Lowry et al.), which is incorporated herein by reference. U.S. Pat. No. 6,409,443 B1, which is also incorporated herein by reference, discloses a spring fastener having a Y-shaped cut funnel, and which may eliminate, if so desired, barbs which are used to support the fastener in one of the parts to be connected together by said fastener.

The fasteners of the type used in industrial applications, wherein the fastener is first inserted into the slot of a sheet, usually a metal sheet, such as the frame of an automobile for example, have barbs which secure initially the fastener on the sheet. After the fastener has been secured on the sheet, the fastener cannot be extracted from the slot without destruction of either the slot or the fastener, since the barbs are disposed against the lower surface of the sheet without the feasibility of springing back when the fastener is pulled from the region of the upper surface of said sheet.

A large number of advantages are derived from the critical configuration of the barbs of the present invention, which allow the extraction of the fastener without destruction of the slot and/or the fastener, as well as the retention of the fastener in slots of various widths preventing rattling noises, as described in detail hereinbelow.

SUMMARY OF THE INVENTION

In the text presented below, the following comments and definitions are appropriate:

The expanding member is preferably a screw having threads and a root on which the threads are supported.

Engageable hole or region is an at least partial hole or region which can be engaged with a screw, or similar element.

At least partial hole may be a part of a hole, such as an arc for example. However, the hole does not have to be round.

Curved portion is defined as a portion having a non-linear configuration, even if it comprises smaller non-aligned linear sections, such as saw tooth for example.

This invention is related to a fastener comprising:
(a) a substantially flat head portion comprising a first hole, the flat head comprising at least a lower side;
(b) a neck having an opening and two side neck portions, the neck extending from the lower side of the substantially flat head portion at a substantially right angle with respect to the substantially flat head portion;
(c) two substantially flat legs extending from the neck, each leg having an inner surface, the two inner surfaces of the two legs being at an initial proximity with each other, the legs being expandable in opposite directions upon inserting through the first hole an expansion member, thus bringing the expansion member to a contact region of the legs, each leg also having side leg portions;
(d) a funnel configuration in the vicinity of the contact region; and
(e) barbs having an origin at a region selected from the side neck portion, and the side leg portion, the barbs also having a front point which front point substantially reaches or exceeds the lower side, the barbs directed outwardly away from the legs.

This invention also pertains an assembly comprising a first part and a fastener,
the first part having an upper surface and a lower surface, a slot commensurate to the fastener, the slot having a length, a width, lower edges, upper edges, and side edges, along its length;

(a) a substantially flat head portion comprising a first hole, the flat head comprising at least a lower side;

(b) a neck having an opening and two side neck portions, the neck extending from the lower side of the substantially flat head portion at a substantially right angle with respect to the substantially flat head portion;

(c) two substantially flat legs extending from the neck, each leg having an inner surface, the two inner surfaces of the two legs being at an initial proximity with each other, the legs being expandable in opposite directions upon inserting through the first hole an expansion member, thus bringing the expansion member to a contact region of the legs, each leg also having side leg portions;

(d) a funnel configuration in the vicinity of the contact region; and (e) barbs having an origin at a region selected from the side neck portion, and the side leg portion, the barbs directed outwardly away from the legs, the barbs also having a front point which front point is substantially disposed above the lower surface of the first part and above the lower edges of the slot.

Further, this invention is related to a fastener comprising:

(a) a substantially flat head portion comprising a first hole, the flat head comprising at least a lower side;

(b) a neck having an opening and two side neck portions, the neck extending from the lower side of the substantially flat head portion at a substantially right angle with respect to the substantially flat head portion;

(c) two substantially flat legs extending from the neck, each leg having an inner surface, the two inner surfaces of the two legs being at an initial proximity with each other, the legs being expandable in opposite directions upon inserting through the first hole an expansion member, thus bringing the expansion member to a contact region of the legs, each leg also having side leg portions;

(d) a funnel configuration in the vicinity of the contact region; and (e) barbs having a front point and an origin at a region selected from the lower head side, the side neck portion, and the side leg portion, the barbs being directed outwardly away from the legs and then inwardly toward the legs.

This invention also pertains an assembly comprising a first part and a fastener, the first part having an upper surface and a lower surface, a slot commensurate to the fastener, the slot having a length, a width, lower edges, upper edges and side edges, along its length;

the fastener being inserted into the slot and comprising:
(a) a substantially flat head portion comprising a first hole, the flat head comprising at least a lower side;
(b) a neck having an opening and two side neck portions, the neck extending from the lower side of the substantially flat head portion at a substantially right angle with respect to the substantially flat head portion;
(c) two substantially flat legs extending from the neck, each leg having an inner surface, the two inner surfaces of the two legs being at an initial proximity with each other, the legs being expandable in opposite directions upon inserting through the first hole an expansion member, thus bringing the expansion member to a contact region of the legs, each leg also having side leg portions;
(d) a funnel configuration in the vicinity of the contact region; and
(e) barbs having a front point and an origin at a region selected from the lower side of the head portion, the side neck portion, and the side leg portion, the barbs being directed outwardly away from the legs and then inwardly toward the legs, the barbs also having sliding portions in contact with at least one of the lower, upper, and side edges of the slot.

The present invention is also related to a fastener comprising:

(a) a substantially flat head portion comprising a first hole, the flat head comprising at least a lower side;

(b) a neck having an opening and two side neck portions, the neck extending from the lower side of the substantially flat head portion at a substantially right angle with respect to the substantially flat head portion;

(c) two substantially flat legs extending from the neck, each leg having an inner surface, the two inner surfaces of the two legs being at an initial proximity with each other, the legs being expandable in opposite directions upon inserting through the first hole an expansion member, thus bringing the expansion member to a contact region of the legs, each leg also having side leg portions;

(d) a funnel configuration in the vicinity of the contact region;

(e) at least one high barb having an origin at a region selected from the side neck portion, and the side leg portion, the at least one high barb also having a front point which front point substantially reaches or exceeds the lower side, the at least one high barb directed outwardly away from the legs; and f) at least one low barb having an origin at a region selected from the side neck portion, and the side leg portion, the at least one low barb also having a front point which front point reaches lower than the lower side, the at least one low barb directed outwardly away from the legs.

The head portion of the fastener may comprise an upper side and a lower side, or it may have a single side corresponding to the lower side, as described for example in U.S. Pat. No. 6,250,864 B1, which is incorporated herein by reference.

The hole may be substantially round or it may be in the form of an oblong opening, as disclosed for example in U.S. Pat. Nos. 6,270,129 B1 and 6,409,443 B1, both of which are incorporated herein by reference.

The fastener may further comprise an elastic body molded at least under the at least lower side of the head of the fastener, as described for example in U.S. Pat. Nos. 5,725,343 and 6,379,092, both of which are incorporated herein by reference.

The first hole is preferably engageable to the expansion member.

The fastener may comprise at least one region under the at least lower side, which region is engageable to the expansion member, as described for example in non-provisional application Ser. No. 09/699,760, which is incorporated herein by reference.

In the case that the head of the fastener has an upper side and a lower side, at least one region under the upper side of the head, may be engageable to the expansion member.

The outwardly and inwardly portions of the barbs should preferably have an angle which is adequately large to allow the fastener to be removed from the first part without destruction of said fastener or said first part, when the removal takes place solely from the side of the first part, wherein the head of the fastener is positioned.

The present invention further pertains parts connected with the above described spring fasteners and/or combinations, as well as vehicles comprising parts connected with the above described spring fasteners.

BRIEF DESCRIPTION OF THE DRAWING

The reader's understanding of this invention will be enhanced by reference to the following detailed description taken in combination with the drawing figures, wherein.

DETAILED DESCRIPTION OF THE INVENTION

The fasteners of the type disclosed in U.S. Pat. No. 4,500,238 are intended for use mainly in hollow walls. Fasteners of the same type, which are used in industrial applications, wherein the fastener is first inserted into the slot of a sheet, usually a metal sheet, such as the frame of an automobile for example, have barbs which secure initially the fastener on the sheet. After the fastener has been secured on the sheet, the fastener cannot be extracted from the slot without destruction of either the slot or the fastener, since the barbs are disposed against the lower surface of the sheet without the feasibility of springing back when the fastener is pulled from the region of the upper surface of said sheet.

The fasteners of the present invention pertain the critical configuration of the barbs, which allow the extraction of the fastener without destruction of the slot and/or the fastener, as described in detail hereinbelow.

Figure 1:
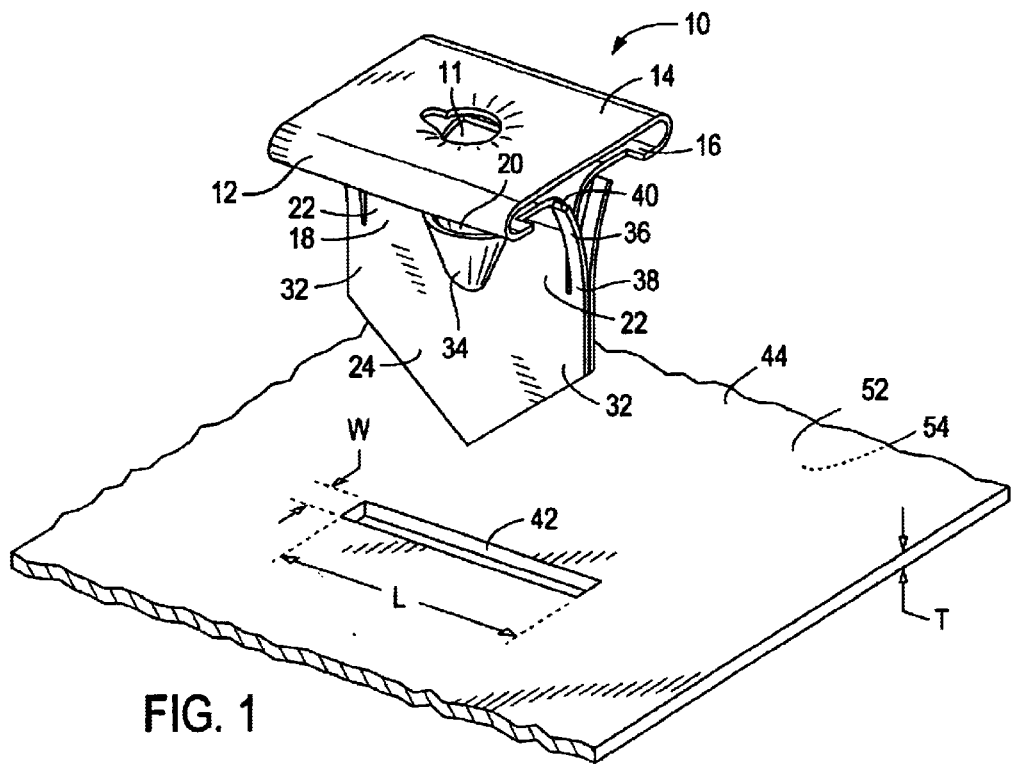
FIG. 1 is a perspective view of fastener and a first part according to a preferred embodiment of the present invention, wherein the front points of the barbs reach or exceed the lower side of the head of the fastener.
Figure 2:
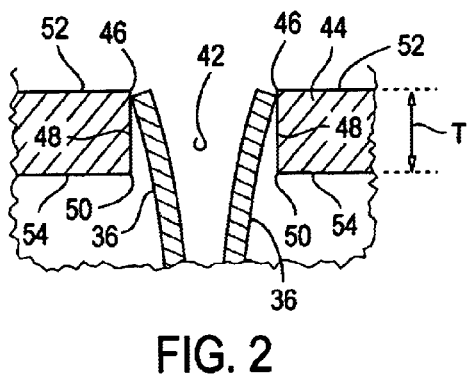
FIG. 2 is a cross section illustrating the barbs with relation to the first part of FIG. 1, after the fastener has been inserted into a slot of the first part, wherein the front points of the barbs substantially reach the lower side of the head of the fastener.
Figure 4:
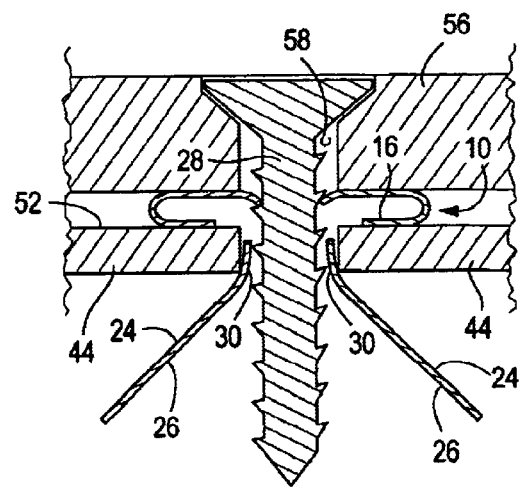
FIG. 4 is a cross section of a combination of a second part attached to the assembly of the fastener and the first part by an expansion member, after said fastener has been inserted to a slot of said first part.

Referring now to FIGS. 1, 2, and 4 there is depicted a fastener 10, which comprises a substantially flat head portion 12 having a hole 11. The hole 11 may be substantially round, oblong, or have any other desirable shape.

In this particular illustration, the flat portion 12 comprises an upper side 14 and a lower side 16. However, in other instances, the flat head 12 my comprise only a lower side (single side), as described for example in U.S. Pat. No. 6,250,864 B1, which is incorporated herein by reference.

The fastener 10, further comprises a neck 18 which has an opening 20 and two side neck portions 22. The neck 18 extends from the lower side 16 of the substantially flat head portion 12 at a substantially right angle with respect to the substantially flat head portion 12.

The fastener 10, also comprises two substantially flat legs extending from the neck 18. Each leg 24 has an inner surface 26 (see FIG. 4). The two inner surfaces 26 of the two legs 24 are at an initial proximity with each other, as shown in FIG. 1, but the legs expand in opposite directions upon inserting through the first hole 11 an expansion member 28, and bringing said expansion member 28 to a contact region 30 of the legs 24. Each leg also has side leg portions 32.

Examples of expansion members are screws, bolts, nails, etc. The hole 11 is preferably but not necessarily engageable to the expansion member 28.

Engagement, if desired, may be achieved in one or more of the miscellaneous regions of the fastener as disclosed in patent application Ser. No. 09/699,760, for example, which patent application is incorporated herein by reference.

The fastener 10, further comprises a funnel configuration 34 in the vicinity of the contact region. The funnel 34 may be conical-like as shown in FIG. 1, or have other shapes, such as for example the funnels disclosed in U.S. Pat. No. 6,280,129 B1, and the funnel shown in FIG. 8.

In addition, the fastener comprises barbs 36. The barbs 36 are directed outwardly away from the legs, and have an origin 38. The origin 38 may preferably be either on the side neck portion 22, or the side leg portion 32. The barbs also have a front point 40, which front point 40 substantially reaches or exceeds (goes over) the lower side 16, as better illustrated in FIG. 1.

In operation, the fastener 10 is inserted into a slot 42 of a first part 44, such as a metal sheet for example. The slot 42 has a length L, a width W, an upper edge 46, a side edge 48, and a lower edge 50.

The metal sheet has a thickness T, an upper surface 42, and a lower surface 54. No matter what the value of the thickness T is, the barbs 36 push against at least one of the edges of the slot 52, thus holding the fastener in the slot 42. The fastener can also be easily pulled away from the slot, since the barbs 36 will slide right out when the fastener 10 is pulled from the side of the head 12 of said fastener 10. Since the barbs 36 reach or exceed the lower side 16, there is no way that they can move under the first part 44, and permanently engage on the lower surface 54 of said first part 44, such as a metal sheet for example.

After the fastener 10 has been inserted into the slot 42 of the first part 44, a second part 56, having a hole 58 is positioned on top of the fastener 10, and the hole 58 is aligned with the hole 11 of the head 12 of the fastener 10. In sequence, the expansion member 28, such a screw for example in inserted and initially engaged on the hole 11, and then proceeds to the contact region there by causing the legs 24 to expand and firmly secure the first part 44 on the second part 56 through the fastener 10, as better shown in FIG. 4.

When it becomes desirable, all parts can be readily disassembled, including the easy separation of the fastener 10 from the first part 44, thanks to the special configuration of the barbs 36 with respect to other elements of the fastener 10.

FIG. 2 illustrates barbs 36, the front points 40 of which substantially reach the lower side 16 (not shown) of the head 12, thus reaching substantially the level of the upper surface 52 of the first part 44. This is because the upper surface 44 is substantially in contact with the lower side 16 of the head 12, during operation, as better shown in FIG. 4.

Figure 1A:
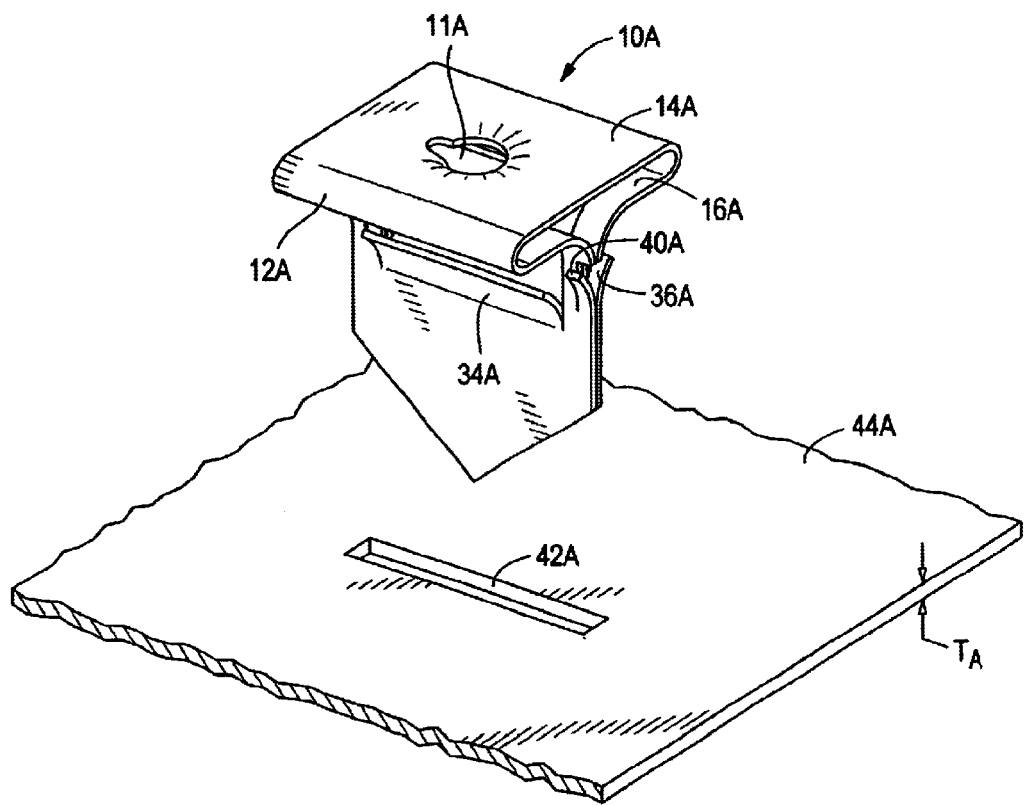
FIG. 1A is a perspective view of fastener having conventional barbs, and a first part having a slot.
Figure 2A:
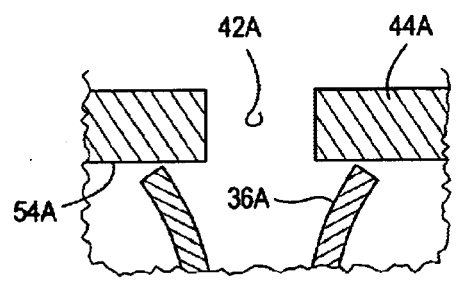
FIG. 2A is a cross section illustrating the barbs with relation to the first part of FIG. 1A, after the fastener has been inserted into a slot of the first part, wherein the front points of the barbs are engaged to the lower surface of the first part.

In contrast, the prior art barbs 36A, better shown in FIGS. 1A and 2A, are designed to be disposed under the first part 44A, after the fastener 10A has been inserted into the slot 42A, and permanently engage on the lower surface 54A. Thus, after the fastener 10A has been inserted into the slot 42A, it cannot be removed without damage to either the fastener 10A or to the part 44A.

Figure 3:
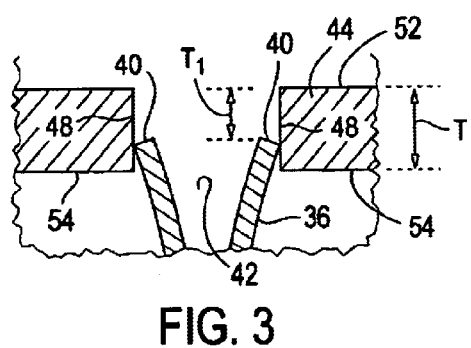
FIG. 3 is a cross section according to another preferred embodiment of the present invention illustrating the barbs in relation to the first part, in the case of an assembly of a fastener and the first part, wherein the distance of the front points of the barbs from the lower side of the head of the fastener is smaller than the thickness of the first part.

A different embodiment of the present invention, is concerned with an assembly of a fastener 10 and a first part 44, wherein the fastener is disposed into a slot 42 of said first part 44. The fastener 10 and the first part are similar to the respective fastener 10 and first part 44 described in the previous embodiment, with the difference that the front point 40 of the barbs 36 of this embodiment is at a distance T1 from the lower side 16 (not shown) of the fastener 10 smaller than the thickness T of the first part. In such a case, as better illustrated in FIG. 3, the front points 40 of the barbs 36 remain necessarily within the slot 42, pushing against the side edges 48 of the slot 42 in a manner to hold the fastener 10 within the slot 42. In different words, in this case, the barbs 36 are also directed outwardly away from the legs 24, and are substantially disposed above the lower surface 54 of the first part 44 and above the lower edges 54 of the slot 42. Therefore, upon disassembling the assembly, the fastener 10 may be easily removed from the slot.

The operation of this embodiment is for all practical purposes identical to the operation of the previous embodiment of the present invention.

Figure 5:
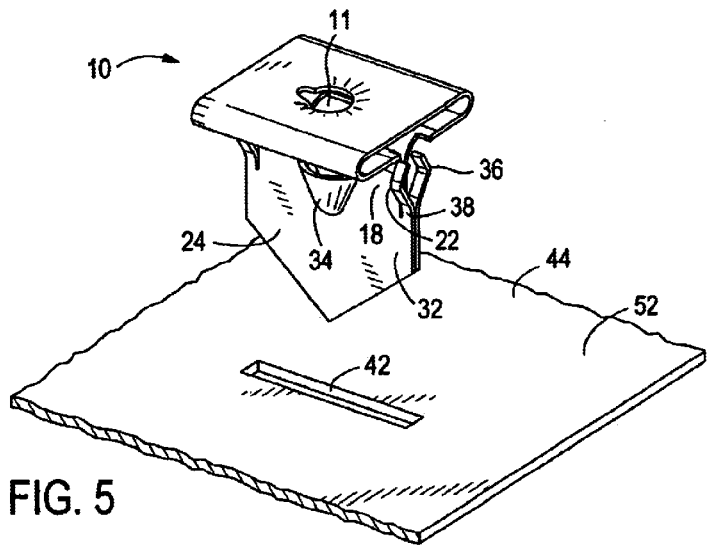
FIG. 5 is a perspective view of fastener and a first part according to another preferred embodiment of the present invention, wherein the barbs are initially directed outwardly and then inwardly.
Figure 6:
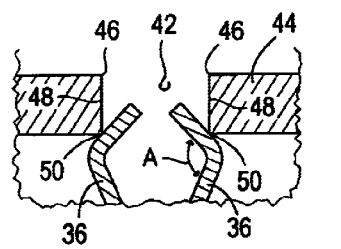
FIG. 6 is a cross section illustrating the barbs with relation to the first part of FIG. 5, after the fastener has been inserted into a slot of the first part, wherein inwardly directed portions of the barbs are engaged to the lower edges of the slot of the first part.

In still a different embodiment, better illustrated in FIGS. 5 and 6, the barbs 36 have an origin 38 at the side neck portion 22 or the side leg portion 32. The barbs 36 are initially directed outwardly away from the legs 24, and then inwardly toward the legs 24 and the neck 18.

The operation of this embodiment is similar to the operation of the previous embodiments with the difference that when the fastener 10 is being inserted into the slot 42, the outwardly directed portions of the barb 36 are initially squeezed, and finally the inwardly directed portions of the barbs 36 find themselves pushing against the lower edges 50 of the slot 42, thus engaging the fastener 10 on the first part 44 through the slot 42.

Figure 7:
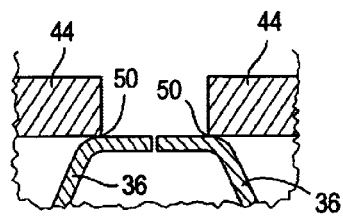
FIG. 7 is a cross section illustrating an example of the barbs with relation to the first part of FIG. 5, after the legs of the fastener have been expanded by an expansion member.

When the second part 56 (see FIG. 4) is secured on the fastener 10 and the first part 44, as already described in the earlier embodiments, the barbs 36 are tilted and assume a position as illustrated in FIG. 7, and further support the attachment of the second object onto the first object. Of course the degree of tilting, may vary, and what is shown in FIG. 7 is just an example.

The angle A (FIG. 6) is preferably larger than 90 degrees. In any event, it should preferably be such that the fastener can be removed from the first object without destruction of said fastener, when the removal takes place solely from the side of the first object, wherein the head of the fastener is positioned.

When it is desired to disassemble the miscellaneous components, the expanding member 28 is removed, which frees the second part 56 from the assembly of the fastener 10 with the first part 44. The legs, assume their initial non-expanded position, and the barbs 36 resume the un-tilted position illustrated in FIG. 6. By pulling the fastener 10 away from the first part 44 (from the side of the upper surface 52) the barbs 36 slide initially on the lower edges 50 toward each other, then over the side edges 48, and finally liberate the fastener 10 from the slot 42 and the first part 44, without any damage to the fastener and/or the first part 44.

Figure 8:
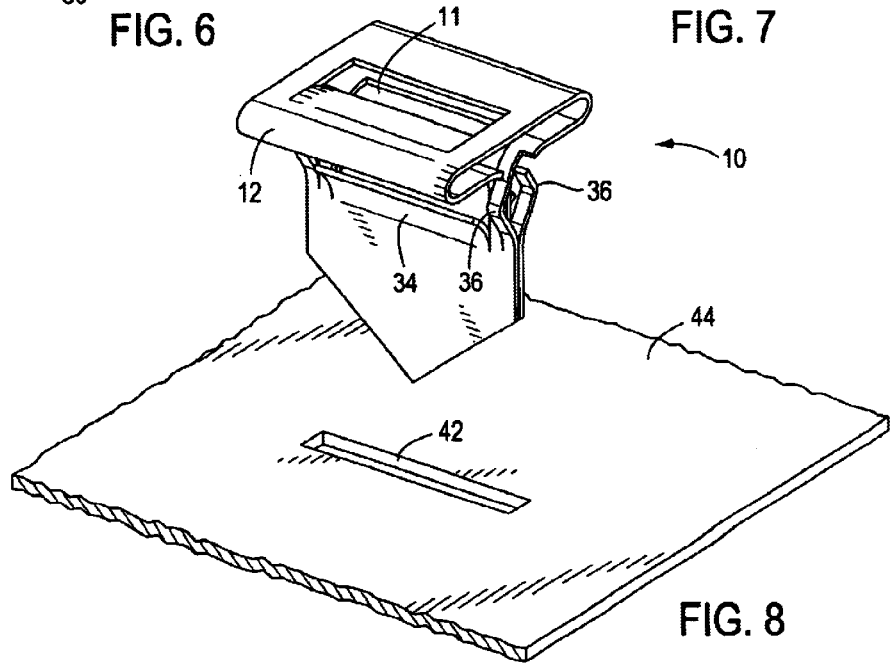
FIG. 8 is a perspective view of fastener and a first part having identical barbs as the barbs of FIG. 5, but wherein the fastener comprises an oblong hole and an oblong funnel.

FIG. 8 illustrates an example of the same type of barbs 36 as the ones described in the above embodiment, on a fastener 10, the head 12 of which fastener 10 has an oblong hole 11, and an oblong Y-shaped funnel 34.

Figure 9:
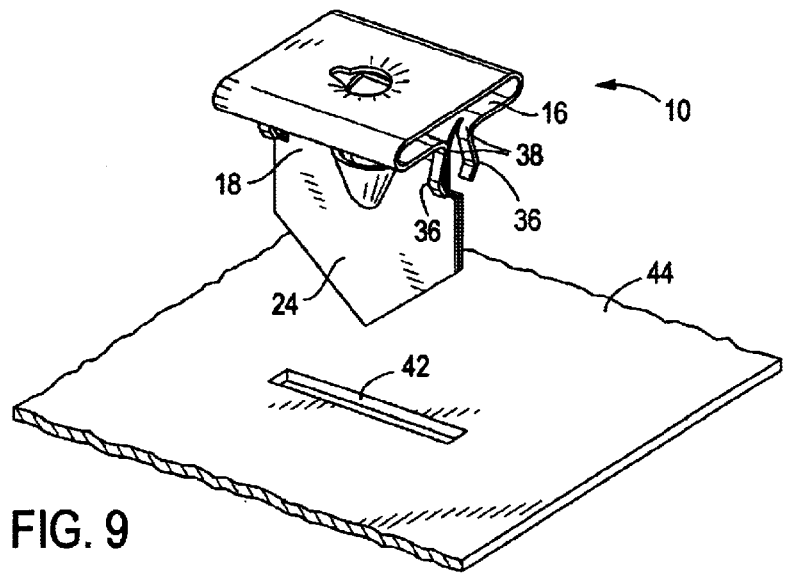
FIG. 9 is a perspective view of fastener and a first part according to another preferred embodiment of the present invention, wherein the barbs originate from the lower side of the head of the fastener, are initially outwardly directed, and then inwardly directed.
Figure 10:
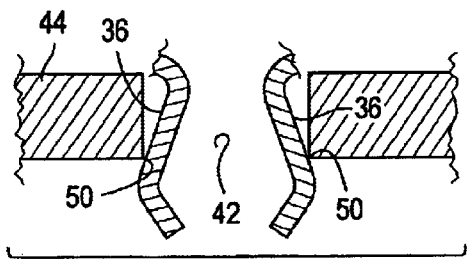
FIG. 10 is a cross section illustrating the barbs with relation to the first part of FIG. 9, after the fastener has been inserted into a slot of the first part, wherein outwardly directed portions of the barbs are engaged to the lower edges of the slot of the first part.
Figure 11:
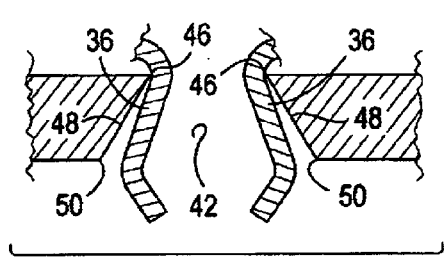
FIG. 11 is a cross section illustrating the barbs with relation to the first part of FIG. 9, after the fastener has been inserted into a slot of the first part, wherein outwardly directed portions of the barbs are engaged to the upper edges of the slot of the first part, provided that the slot has appropriate partial conical shape to allow this type of engagement.

In still another embodiment of this invention, better illustrated in FIGS. 9, 10, and 11, the origin 38 of the barbs 36 is disposed at the lower side 16 of the fastener 10. Again, the barbs are initially directed outwardly away from the legs 24 and the neck 18, and then inwardly toward the legs 24 and the neck 18.

The operation of this embodiment is similar to the operation of the previous embodiment with the difference that when the fastener 10 is being inserted into the slot 42, the inwardly directed portions of the barb 36 are initially squeezed, and finally the outwardly directed portions of the barbs 36 find themselves pushing against the lower edges 50 of the slot 42, thus engaging the fastener 10 on the first part 44 through the slot 42, as better illustrated in FIG. 10.

FIG. 11 illustrates a case that the slot 42 has a partial conical shape, in which case the barbs 36 may be pushed against the upper edges 46 of the slot 42. As a matter of fact, the conical shape may be such that the barbs 36 are pushed (not shown) against all three edges 46, 48, and 50.

Figure 12:
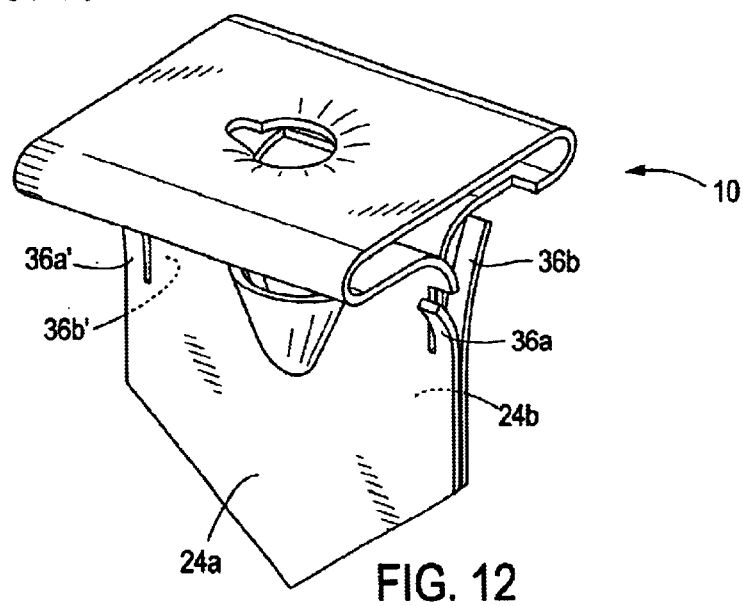
FIG. 12 is a perspective view of a fastener according to another preferred embodiment of the present invention.

In another embodiment of this invention, better shown in FIG. 12, the fastener 10 has a front leg 24a and a back leg 24b. The front leg 24 comprises a first front barb 36a and a second front barb 36a'. The back leg 24b comprises a first back barb 36b opposite the respective front first barb 36a, and a second back barb 36b' opposite the respective front barb 36a'. The characteristics of the particular barbs and their functionality have already been described hereinabove, and they do not need any further clarification.

It is highly preferable that the barbs 36a an 36b' have the characteristics of barbs 36A illustrated in FIGS. 1A and 2A, while the barbs 36a' and 36b have the characteristics of the barbs illustrated in FIGS. 1, and/or 2, or 3. However, this invention includes the case that at least one of the barbs has the characteristics of 36A illustrated in FIGS. 1A and 2A, while the rest of the barbs have the characteristics of the barbs illustrated in FIGS. 1, and/or 2, or 3.

The barbs which have the characteristics of the barbs illustrated in FIGS. 1, and/or 2, or 3 are collectively named high barbs, while the barbs which have the characteristics of barbs 36A illustrated in FIGS. 1A and 2A are collectively named low barbs.

In operation of this embodiment, the fastener 10 of FIG. 10 is inserted into the slot 42 of the first part 44, such as metal sheet for example, illustrated in FIG. 1. The barb(s) having the characteristics of the barbs illustrated in FIGS. 1, and/or 2, or 3 (high barbs) prevent rattling of the fastener in the slot 42 for various widths W (see FIG. 1) of the slot 42 and/or various thicknesses of the first part 44, while the barb(s) having the characteristics of barbs 36A illustrated in FIGS. 1A and 2A (low barbs) secure the fastener 10, and prevent it from falling off the slot 24 of the part 44.

As aforementioned, the head of the fastener may have an upper side and a lower side or it may have a single side corresponding to the lower side. Examples of fasteners having single sided heads are described in U.S. Pat. No. 6,250,864 B1, which is incorporated herein by reference.

When water-proofing, and/or gas-proofing are desired for a particular application, and/or vibration noises are to be prevented, an elastic body is preferably integrally molded at least at the lower side of the substantially flat head portion. Such elastic bodies are for example disclosed in U.S. Pat. Nos. 5,725,343 (Smith), and 6,379,092 (Patel et al.) both of which are incorporated herein by reference.

As also aforementioned, the fastener may comprise at least one region under the at least lower side, which region is engageable to the expansion member, as described for example in non-provisional application Ser. No. 09/699,760 which is incorporated herein by reference.

It should be noted that the barbs 36 may be disposed as a mirror image against each other as shown in the Figures, but they may also be positioned sideways so that one barb can cross its respective barb, thus forming inner and outer barbs, as disclosed in non-provisional patent application Ser. No. 10/164,963, filed Jun. 7, 2002, which is incorporated herein by reference. Their width may be uniform along their length or non-uniform, as also disclosed in the same application Ser. No. 10/164,963.

This invention pertains fasteners alone, assemblies of fasteners with a first part, assemblies of fasteners with a first part wherein a second part has been attached to said assemblies, and vehicles comprising any of the above.

Indiscriminately, each of the first and the second parts may be for example a plastic panel or a metal sheet or a handle, or a different type of an object.

It is evident that the embodiments of the above applications may have to be adjusted to fit the requirements of the instant invention.

The embodiments described hereinabove serve illustration purposes only regarding this invention, which should only be bound by the claims.

Any explanations given are speculative and should not restrict the scope of the claims.

A large number of advantages are derived from the critical configuration of the barbs of the present invention, which allow the extraction of the fastener without destruction of the slot and/or the fastener, as well as the retention of the fastener in slots of various widths preventing rattling noises, as described in detail hereinabove.

What is claimed is:

1. A spring fastener comprising:
   (a) a substantially flat head portion comprising a first hole, the flat head comprising at least a lower side;
   (b) a neck having an opening and two side neck portions, the neck extending from the lower side of the substantially flat head portion at a substantially right angle with respect to the substantially flat head portion;
   (c) two substantially flat legs extending from the neck, each leg having an inner surface, the two inner surfaces of the two legs being at an initial proximity with each other, the legs being expandable in opposite directions upon inserting through the first hole an expansion member, thus bringing the expansion member to a contact region of the legs, each leg also having side leg portions;
   (d) a funnel configuration in the vicinity of the contact region; and
   (e) barbs having an origin at a region selected from the side neck portion, and the side leg portion, the barbs also having a front point which front point reaches or exceeds the lower side, the barbs directed outwardly away from the legs.

2. A spring fastener as defined in claim 1, wherein the head portion of the spring fastener comprises an upper side in addition to the lower side.

3. A spring fastener as defined in claim 1, wherein the head portion of the fastener has a single side corresponding to the lower side.

4. A spring fastener as defined in claim 1, wherein the hole is substantially round.

5. A spring fastener as defined in claim 1, wherein the hole comprises an oblong opening.

6. A spring fastener as defined in claim 1, wherein the fastener comprises an elastic body molded at least under the at least lower side of the head of the fastener.

7. A spring fastener as defined in claim 4, wherein the fastener comprises an elastic body molded at least under the at least lower side of the head of the fastener.

8. A spring fastener as defined in claim 1, wherein the first hole is engageable to the expansion member.

9. A spring fastener as defined in claim 1, wherein the fastener comprises at least one region under the at least lower side, which region is engageable to the expansion member.

10. A spring fastener as defined in claim 2, wherein the fastener comprises at least one region under the at upper side of the head, which region is engageable to the expansion member.

11. An assembly comprising a first part and a fastener, the first part having an upper surface and a lower surface, a slot commensurate to the fastener, the slot having a length, a width, lower edges, upper edges, and side edges, along its length;
   (a) a substantially flat head portion comprising a first hole, the flat head comprising at least a lower side;
   (b) a neck having an opening and two side neck portions, the neck extending from the lower side of the substantially flat head portion at a substantially right angle with respect to the substantially flat head portion;

(c) two substantially flat legs extending from the neck, each leg having an inner surface, the two inner surfaces of the two legs being at an initial proximity with each other, the legs being expandable in opposite directions upon inserting through the first hole an expansion member, thus bringing the expansion member to a contact region of the legs, each leg also having side leg portions;

(d) a funnel configuration in the vicinity of the contact region; and (e) barbs having an origin at a region selected from the side neck portion, and the side leg portion, the barbs directed outwardly away from the legs, the barbs also having a front point which front point is substantially disposed above the lower surface of the first part and above the lower edges of the slot.

12. An assembly as defined in claim 11, wherein the head portion of the fastener comprises an upper side in addition to the lower side.

13. An assembly as defined in claim 11, wherein the head portion of the fastener has a single side corresponding to the lower side.

14. An assembly as defined in claim 1, wherein the hole is substantially round.

15. An assembly as defined in claim 11, wherein the hole comprises an oblong opening.

16. An assembly as defined in claim 11, wherein the fastener comprises an elastic body molded at least under the at least lower side of the head of the fastener.

17. An assembly as defined in claim 14, wherein the fastener comprises an elastic body molded at least under the at least lower side of the head of the fastener.

18. An assembly as defined in claim 11, wherein the first hole is engageable to the expansion member.

19. An assembly as defined in claim 11, wherein the fastener comprises at least one region under the at least lower side, which region is engageable to the expansion member.

20. An assembly as defined in claim 12, wherein the fastener comprises at least one region under the at upper side of the head, which region is engageable to the expansion member.

21. A vehicle comprising a first part having a slot and a second part having a hole, the two parts connected with a fastener, the fastener comprising:

(a) a substantially flat head portion comprising a first hole, the flat head comprising at least a lower side;

(b) a neck having an opening and two side neck portions, the neck extending from the lower side of the substantially flat head portion at a substantially right angle with respect to the substantially flat head portion;

(c) two substantially flat legs extending from the neck, each leg having an inner surface, the two inner surfaces of the two legs being at an initial proximity with each other, the legs being expandable in opposite directions upon inserting through the first hole an expansion member, thus bringing the expansion member to a contact region of the legs, each leg also having side leg portions;

(d) a funnel configuration in the vicinity of the contact region; and (e) barbs having an origin at a region selected from the side neck portion, and the side leg portion, the barbs also having a front point which front point reaches or exceeds the lower side, the barbs directed outwardly away from the legs.

22. A vehicle comprising an assembly, the assembly comprising a first part and a fastener, the first part having an upper surface and a lower surface, a slot commensurate to the fastener, the slot having a length, a width, lower edges, upper edges, and side edges, along its length;

(a) a substantially flat head portion comprising a first hole, the flat head comprising at least a lower side;

(b) a neck having an opening and two side neck portions, the neck extending from the lower side of the substantially flat head portion at a substantially right angle with respect to the substantially flat head portion;

(c) two substantially flat legs extending from the neck, each leg having an inner surface, the two inner surfaces of the two legs being at an initial proximity with each other, the legs being expandable in opposite directions upon inserting through the first hole an expansion member, thus bringing the expansion member to a contact region of the legs, each leg also having side leg portions;

(d) a funnel configuration in the vicinity of the contact region; and (e) barbs having an origin at a region selected from the side neck portion, and the side leg portion, the barbs directed outwardly away from the legs, the barbs also having a front point which front point is substantially disposed above the lower surface of the first part and above the lower edges of the slot.

* * * * *